Oct. 6, 1925.

A. SZABO ET AL

SAFETY NUT

Filed Oct. 29, 1924

1,556,177

INVENTORS
Alex Szabo
Peter Balogh
BY
ATTORNEY

Patented Oct. 6, 1925.

1,556,177

UNITED STATES PATENT OFFICE.

ALEX SZABO AND PETER BALOGH, OF PERTH AMBOY, NEW JERSEY.

SAFETY NUT.

Application filed October 29, 1924. Serial No. 746,482.

*To all whom it may concern:*

Be it known that we, ALEX SZABO and PETER BALOGH, both citizens of Hungary, residing at Perth Amboy, in the county of Middlesex and State of New Jersey, have invented certain new and useful Improvements in Safety Nuts, of which the following is a specification.

This invention relates to nut locks, the invention having for an object to provide a novel and improved form of nut lock that will securely lock the nut to the bolt, while permitting ready removal of the nut when desired.

For further comprehension of the invention and of the objects and advantages thereof, reference will be had to the following description and accompanying drawing, and to the appended claims in which the various novel features of the invention are more particularly set forth.

Fig. 1 of the drawing is a perspective view of a nut provided with our improved locking means.

Figure 1:
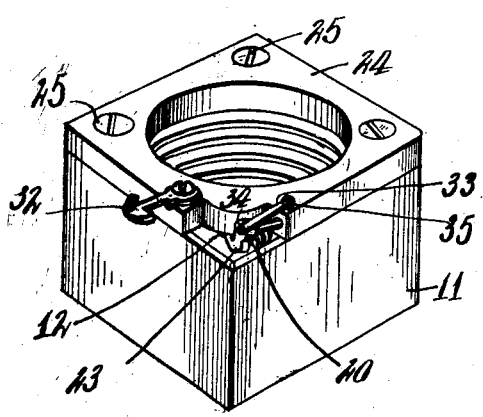
Figure 2:
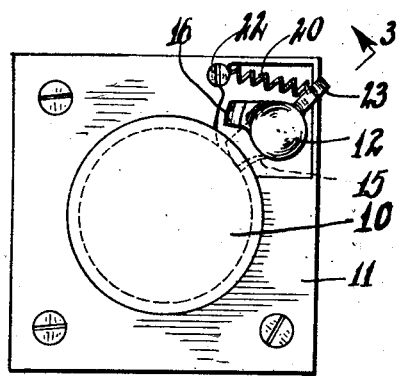
Fig. 2 is an end view with the face plate of the nut removed.
Figure 3:
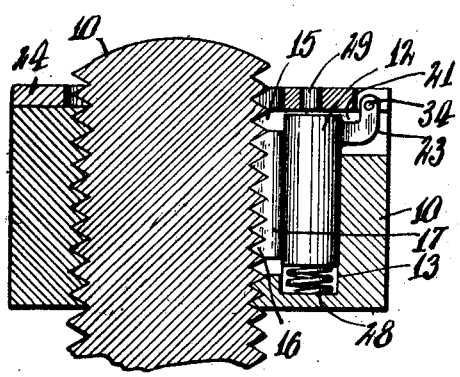
Fig. 3 is a longitudinal sectional view taken on the line 3—3 of Fig. 2 and showing the face plate in place on the nut.

In the drawing the reference numeral 10 indicates a bolt of ordinary construction, and a nut 11 screwed thereon, our improved locking means being applied to the nut and requiring no special construction of the bolt, or modification of the latter in any manner. The nut locking means comprises a rotary plug 12 of cylindrical form that is positioned in a boring or socket 13 sunk into the outer face of the nut in one corner thereof and parallel to the axis of the nut. The intervening wall between the socket 13 and the bore of the nut is cut away to leave a vertical slot 15 that accommodates the bolt gripping elements. These bolt gripping elements are comprised by a number of teeth 16 formed on the edge of a rib 17 projected from one side of the plug 12 and extending longitudinally of the latter, the teeth on the rib conforming in pitch and configuration to the threads on the bolt.

The plug 12 is placed at such distance from the bore of the nut that the teeth 16 will project a slight distance into said bore when the rib is swung to a radial position, so that when the nut is screwed on the bolt the teeth will tend to wedge against the threads on the bolt. The plug is held in position with the teeth thereon bearing against the threads on the bolt by means of a coiled tension spring 20 located in a recess 21 in the face of the nut and connected at one end to a screw 22 threaded into a socket in the latter and at its opposite end to an arm 23 fixed to and projecting laterally from the plug, this arm being accommodated in the recess 21. A faceplate 24 is secured as by the screws 25 on the face of the nut and serves to cover the end of the plug 12, and the recess 21. When applying the device to a bolt the plug 12 is adjusted longitudinally a sufficient distance to accommodate the teeth 16 to the threads on the bolt. To facilitate this adjustment a coiled expansion spring 28 may be located in the socket 13 behind the plug and bear on one end of the latter, normally urging the other end of the plug against the face plate 24. The face plate has an aperture 29 therein that registers with the plug through which a suitable implement such as a nail or the end of a screwdriver may be inserted to adjust the plug longitudinally so that its teeth will be in longitudinal registry with the threads on the bolt.

To retain the locking member in released position a detent latch 32 is pivoted on the face plate 24 and may be swung to position engaging the arm 23 after the latter has been swung to releasing position. To hold the locking member in operative position we may loop a wire 33 through apertures 34 and 35 in the end of the arm 23 and the face plate 24 respectively. The ends of this wire may be twisted together.

Figure 4:
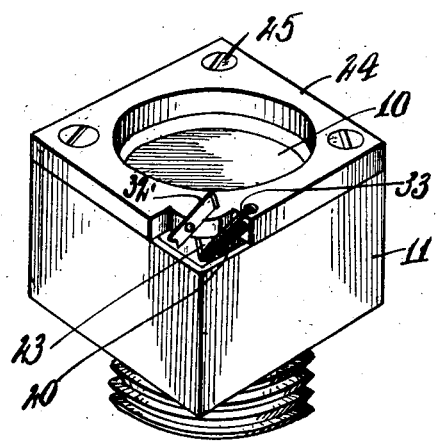
Fig. 4 is a similar view to Fig. 1 but showing a modified construction.

The form of the device shown in Fig. 4 differs from that above described only in a different positioning of the latch 32'.

Having thus described our invention, what we claim as new and desire to protect by Letters Patent of the United States is as follows:—

1. In a nut lock, a nut having a socket entered thereinto from the face thereof parallel to the bore of the nut, a plug rotatably mounted in said socket, and projections on one side of the plug adapted to be projected into the marginal portion of the bore of the nut by rotation of the plug, said projections comprising teeth formed in correspondence to the threads of the nut, and said plug being longitudinally adjustable in the said socket to bring the said teeth into registry with the threads of a bolt on which the nut is threaded.

2. In a nut lock, a nut having a socket entered thereinto from the face thereof parallel to the bore of the nut, a plug rotatably mounted in said socket, and projections on one side of the plug adapted to be projected into the marginal portion of the bore of the nut by rotation of the plug, and a faceplate mounted on said nut and covering said plug, and a spring bearing on said plug and urging the latter against the said faceplate, said faceplate having an aperture therein in registry with the end of the plug to receive a tool for moving the nut longitudinally against the pressure of said spring.

In testimony whereof we have affixed our signatures.

ALEX SZABO.
PETER BALOGH.